No. 855,470. PATENTED JUNE 4, 1907.
C. MITTELSTRASS & A. FRANK.
MOTOR CONTROLLING DEVICE.
APPLICATION FILED OCT. 17, 1906.
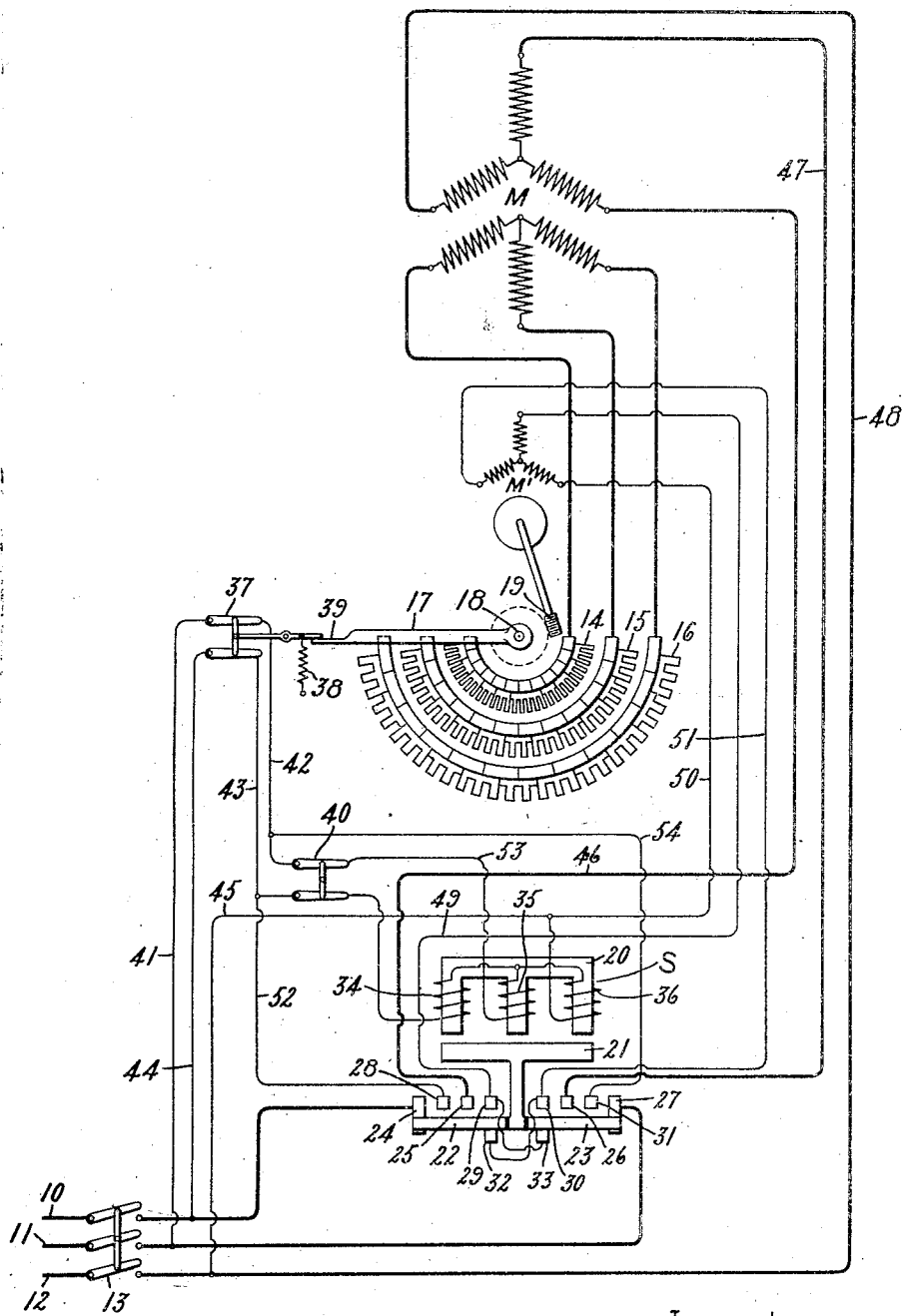
Witnesses:
George W. Tilden.
Inventors:
Carl Mittelstrass,
Albrecht Frank,
by Albert G. Davis
Att'y.

UNITED STATES PATENT OFFICE.

CARL MITTELSTRASS, OF HERMSDORF, AND ALBRECHT FRANK, OF BERLIN, GERMANY, ASSIGNORS TO GENERAL ELECTRIC COMPANY, A CORPORATION OF NEW YORK.

MOTOR-CONTROLLING DEVICE.

No. 855,470.  Specification of Letters Patent.  Patented June 4, 1907.

Application filed October 17, 1906. Serial No. 339,352.

*To all whom it may concern:*

Be it known that we, CARL MITTELSTRASS and ALBRECHT FRANK, subjects of the Emperor of Germany, residing at Hermsdorf and Berlin, Germany, respectively, have invented certain new and useful Improvements in Motor-Controlling Devices, of which the following is a specification.

This invention relates to devices for controlling electric motor circuits and has for its object the provision of a device of this character, which upon the occurrence of abnormal conditions in the circuit, will automatically return to a position to protect the motor.

Our invention relates more specifically to starting or controlling devices for electric motors in which an auxiliary motor is utilized for the movement of the controlling arm.

In carrying out our invention, we provide in connection with an impedance in the main motor circuit, such as either reactance or resistance coils, an auxiliary motor for cutting said coils in and out of circuit. The motor is connected to the controlling arm in some way, as by gearing, and drives it to the desired position. In case abnormal circuit conditions occur while the arm is in this position, such as the failure of voltage on the line, we arrange the circuit connections of the auxiliary motor in such a way that when the main motor circuit opens, the auxiliary motor connections are so changed that when normal circuit conditions return, the motor will reverse and return the controlling arm to the starting or protective position.

In the accompanying drawing we have shown one embodiment of our invention but it should be understood that its particular arrangement is shown really for purposes of illustration, and that many modifications thereof will suggest themselves to those skilled in the art without departing from the spirit of our invention.

Referring to the drawing M represents a motor, which in this particular instance, we have shown as a 3-phase induction motor, although the particular type of motor used or the electric circuit in which it is used are not essential features of our invention. This motor is supplied with current from 3-phase mains 10, 11 and 12, a switch 13 being provided in the main circuit. In circuit with the rotor of the motor are the impedances 14, 15 and 16, one for each phase, contacts being provided for cutting out sections of the impedance proportionally and consecutively. A controlling arm 17 is pivoted at 18 and is arranged to co-operate with these contacts to cut out the resistance in the usual way, while an auxiliary motor M' has its rotor geared to the arm 17 by a worm 19. The main motor circuit is opened and closed by means of an electromagnetic switch S having a core 20 and armature 21. This armature has connected therewith the contact bars 22 and 23 which are insulated from each other and from the armature proper. This switch is arranged so as to bridge contacts 24 and 25 on one side and contacts 26 and 27 on the other, so as to close the main motor circuit, and auxiliary contacts 28, 29, 30 and 31 are arranged to control the circuit of the auxiliary motor as well as the circuit of the energizing coils of the switch S. When the switch is raised to its upper position, the auxiliary contacts on each side are bridged, while in its lower position, it bridges the auxiliary contacts 32 and 33 for reversing the auxiliary motor. The energizing coils 34, 35 and 36 are controlled by a switch 37 which is spring-pressed to an open position by a spring 38. In its starting or initial position, the arm 17 holds the switch 37 closed by means of a finger 39, engaging the end of the switch arm, but as soon as it leaves this position, the switch will automatically open. A second switch 40, preferably hand-operated, is provided to control the circuit of the switch coils.

The arrangement of the circuits is as follows: When the switch 13 is closed, the current passes from main 11 through conductor 41, switch 37, conductor 42, switch 40 through the energizing winding 35 and thence through the windings 34 and 36, returning from the former through the switch 40, conductor 43, switch 37 and conductor 44, and from the latter through conductor 45. These coils being energized, armature 21 is drawn up to core 20, closing the main motor circuit as follows: from main 10 to contact 24, contact bar 22, contact 25 and conductor 46 to the stator of the motor, returning through conductor 47, contact 26, contact bar 23, contact 27 to main 11 and through conductor 48 to main 12. The auxiliary motor is likewise energized as follows: from main 10 and contact 24 to contact 29 through contact bar 22 thence through conductor 49 through auxiliary motor M', returning through conductors 50 and 51 to mains 12 and 11 respectively, the latter by way of contact 30, bar 23 and contact 27. The auxiliary motor thus being energized, the arm 17 is revolved in a counter-clockwise direction, cutting out sections of the impedance. As soon as the arm 17 leaves its initial position the switch 37 is opened. This would ordinarily de-energize the coils 34, 35 and 36 but the circuits of these coils are in the meantime completed by contact bars 22 and 23. The circuit of these coils will then be as follows: from contact 24, bar 22, contact 28, conductor 52, switch 40, windings 34 and 35, conductor 53, switch 40, conductor 54, contacts 31 and 27 back to main 11. The current also passes through winding 36 thence back to main 12 through conductor 45. The motor will thus continue to run until stopped in some manner as through the agency of the operator, and the controlling arm 17 will rest in the desired position. If now, there is a failure of voltage on the line, coils 34, 35 and 36 will be de-energized and the armature 21 will drop, breaking the circuit of the energizing coils and also changing the auxiliary motor connections, circuit being made through contacts 32 and 33 instead of through contacts 29 and 30. When the line voltage is re-established, armature 21 will not be attracted but the auxiliary motor will be energized in a direction so as to reverse it, the current passing through contact 24 to contact 32 thence through the cross connection to contact 30 and conductor 51, returning through conductors 49 and 50, the latter conductor passing to main 12 through conductor 45, while conductor 49 passes from contact 29 through the cross connection to contact 33 thence by contact bar 23 and contact 27 to main 11. The motor thus starts in a reverse direction and continues until it reaches the starting position. When the starting or initial position is reached, the switch 37 is closed and the coils 34, 35 and 36 are again energized and armature 21 attracted. The motor connections are thus again changed, and the arm 17 is rotated in a counter-clockwise direction as before.

It will thus be seen that the motor is protected from damage due to abnormal circuit conditions. When the circuit is opened by failure of voltage, it cannot be again closed until the controlling arm is placed in its initial position, and all the impedance is in circuit. The means whereby we have accomplished this result are extremely simple and positive, while at the same time being thoroughly efficient and reliable.

Many modifications will suggest themselves to those skilled in the art but it should be understood that the construction which we have shown is merely typical, and our invention is only limited by the scope of the claims annexed hereto.

What we claim as new and desire to secure by Letters Patent of the United States, is,—

1. The combination with an electric motor circuit of a controlling device therefor comprising an impedance, an auxiliary motor for varying the same, and means controlled by the movement of said device for reversing said auxiliary motor.

2. The combination with an electric motor circuit of means for controlling the same comprising an auxiliary motor, and means for automatically changing the connections thereof upon failure of voltage in the circuit, so as to reverse the auxiliary motor upon the return of voltage.

3. The combination with an electric motor circuit of means for controlling the same comprising an auxiliary motor, an electromagnetic switch in the main motor circuit, and connections whereby said switch automatically reverses said auxiliary motor.

4. The combination with an electric motor circuit of means for controlling the same comprising an impedance, an electric motor for varying the same, and means for automatically changing the connections thereof upon failure of voltage so as to reverse the said motor upon the return of voltage.

5. The combination with an electric motor circuit of means for controlling the same comprising an impedance, an auxiliary motor for varying the same, and electrically controlled means for automatically changing the connections of said motor upon the failure of voltage so as to reverse the same upon the return of voltage.

6. The combination with an electric motor circuit of means for controlling the same comprising an auxiliary motor, an electrically controlled device for closing the main motor circuit, and means whereby said device changes the connections of said auxiliary motor upon the failure of voltage so as to reverse the same upon the return of voltage.

7. The combination with an electric motor circuit of means for controlling the same comprising an impedance, an auxiliary motor for varying the same, an electromagnetic device for automatically opening said main motor circuit, and means whereby the connections of said auxiliary motor are changed upon the opening of said main motor circuit so as to reverse the motor upon the closing of the main circuit.

8. The combination with an electric motor circuit of means for controlling the same comprising an auxiliary motor, an electromagnetic device for automatically opening said motor circuit, and means controlled by the movement of said device whereby the connections of said auxiliary motor are changed upon the opening of said main motor circuit so as to reverse the motor upon the closing of the main circuit.

9. The combination with an electric motor circuit of means for controlling the same comprising an auxiliary motor, an electromagnetic switch for opening and closing said main motor circuit, and connections whereby said auxiliary motor will run in one direction when the switch is open and in the opposite direction when the switch is closed.

10. The combination with an electric motor circuit of means for controlling the same comprising an auxiliary motor, an electromagnetic switch for automatically opening said motor circuit upon the occurrence of abnormal conditions therein, and connections whereby said auxiliary motor will run in one direction when the switch is open and in the opposite direction when the switch is closed.

In witness whereof, I have hereunto set my hand this third day of October, 1906.

CARL MITTELSTRASS.
ALBRECHT FRANK.

Witnesses:
JULIUS RINNLAND,
KARL KREKEBEN.